United States Patent [19]

Jones

[11] 4,243,193
[45] Jan. 6, 1981

[54] CLAMP

[75] Inventor: Robert D. Jones, Oskaloosa, Iowa

[73] Assignee: Intraco, Inc., Oskaloosa, Iowa

[21] Appl. No.: 907,119

[22] Filed: May 18, 1978

[51] Int. Cl.³ .............................................. F16L 3/10
[52] U.S. Cl. ...................................... 248/62; 248/301
[58] Field of Search .................. 248/62, 58, 301, 341, 248/343, 316 B, 316 C, 61; 29/415; 24/242, 241 S, 232; 294/3, 119

[56] References Cited

U.S. PATENT DOCUMENTS

| 712,959 | 11/1902 | Pohlman | 24/232 |
|---|---|---|---|
| 726,636 | 4/1903 | Carll | 248/62 |
| 850,623 | 4/1907 | Clark | 248/62 |
| 867,760 | 10/1907 | Schang | 248/62 |
| 947,441 | 1/1910 | Hankin et al. | 248/74 R X |
| 1,546,839 | 7/1925 | Klingel | 248/62 |
| 1,709,805 | 4/1929 | Peirce | 248/300 X |
| 2,360,004 | 10/1944 | MacLean | 29/415 |
| 2,421,447 | 6/1947 | Watkins | 248/62 |
| 3,536,287 | 10/1970 | Kramer | 248/301 |
| 4,029,276 | 6/1977 | Zielie | 248/74 R |
| 4,046,344 | 9/1977 | Scanlan | 248/74 R X |

FOREIGN PATENT DOCUMENTS 581977  12/1924  France ................................. 248/74 R Primary Examiner—Rodney H. Bonck
Attorney, Agent, or Firm—Henderson & Sturm

[57] ABSTRACT

A tube hanger for a cable conveying system including a pair of substantially identical sheet metal members wherein each of the members includes a hook portion, a tube engaging portion and a suspension portion with an opening being disposed in the suspension portion. The hook portions are connected together and the openings are in alignment for reception of an S-shaped hook for connecting the tube hanger to a supporting member and for holding the members together in a tube supporting position. The sheet metal members have an inside contour which is identical to the outside contour whereby such members can be stamped from a single sheet of metal without wasting material between members being formed.

4 Claims, 5 Drawing Figures

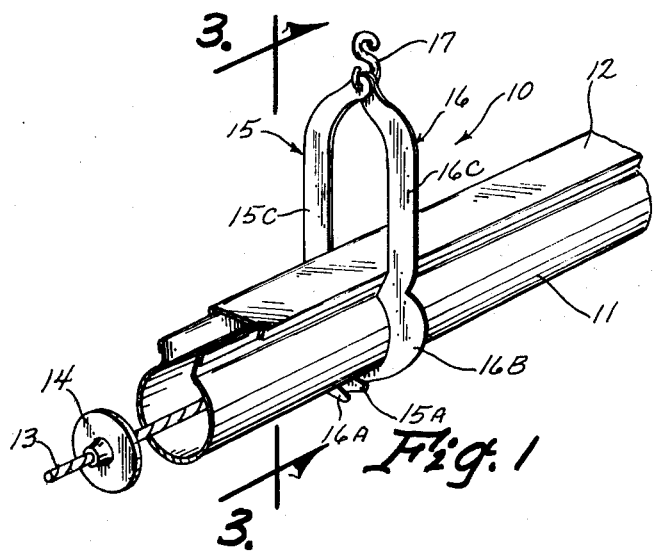
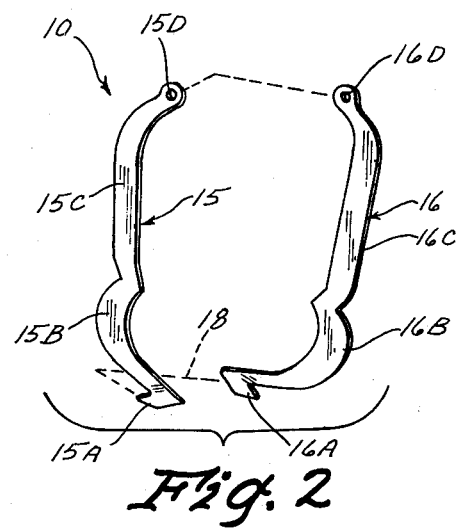
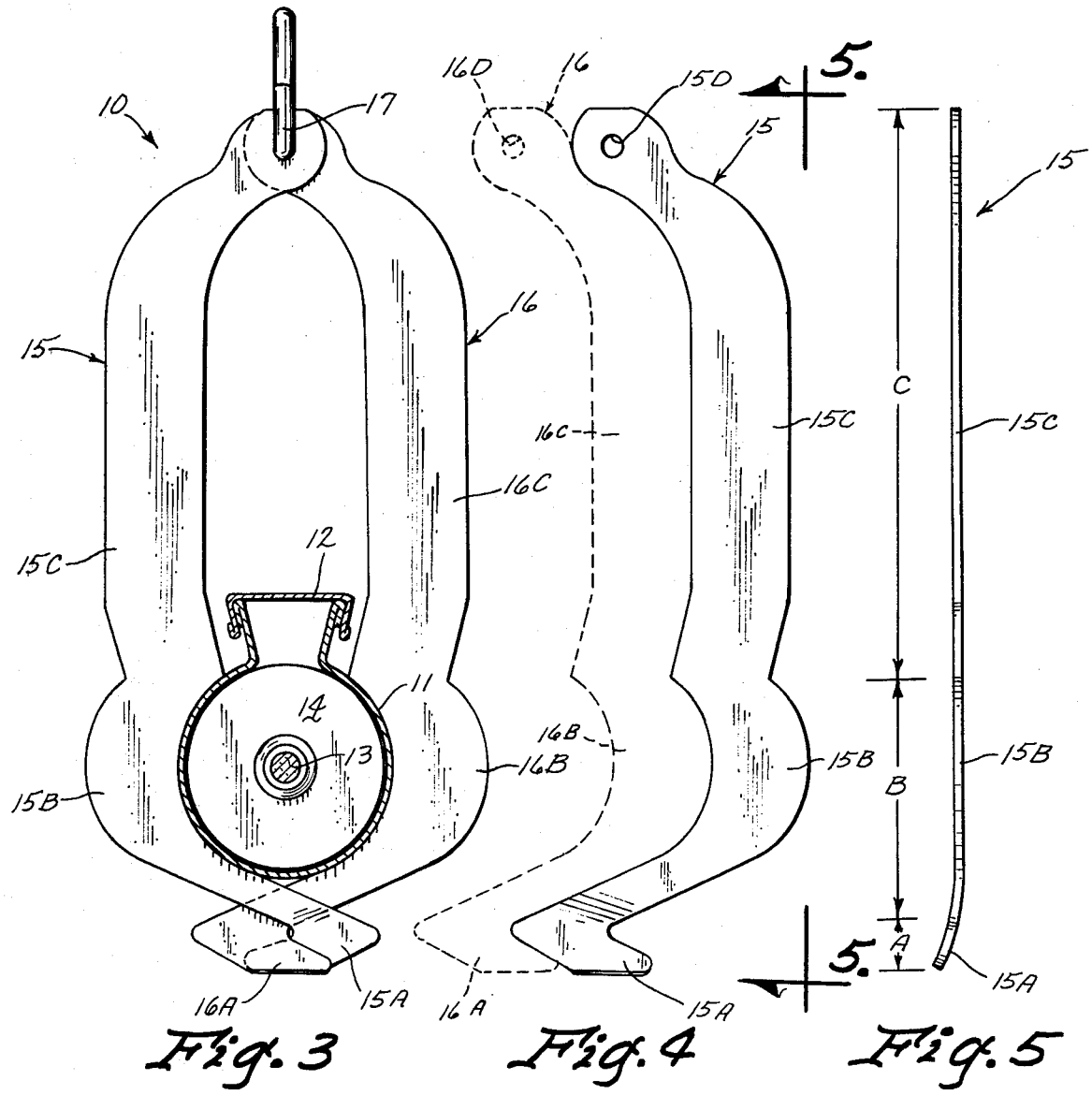

CLAMP

BACKGROUND OF THE INVENTION

The present invention relates generally to conveying systems in which material is conveyed through tubes, and more particularly to a tube hanger for such conveying systems.

In conveying systems of a type including a tubular circuitous network having a circuitous cable or chain conveyor therein, it is customary to hang such tubes from various support structures around a building or the like. A common type of clamp for such use is a sheet metal structure composed of two parts and having holes in each end. The two clamp parts are then bolted together around such tube and to whatever support structure is provided in the building to provide a hanger for such tubular network. It can be easily appreciated that this is a relatively time consuming procedure since a large number of such support structures are necessary for each cable conveying system and, of course, the larger the system the more time consuming this becomes.

Another problem associated with the prior art of hanging tubular conveying systems is the one of cost. While the total cost for individual hanging mechanism is not great, even a small savings in the manufacturing costs thereof can be very significant because of the large number of such tube hanging devices which are used for each conveying system. Consequently, there is an economic incentive to keep the costs of such tube hanging equipment at a minimum.

SUMMARY OF THE INVENTION

The present invention relates to a tube hanger for a cable conveying system including a pair of substantially identical sheet members wherein each of the members includes a hook portion, a tube engaging portion and a suspension portion with an opening being disposed in the suspension portion. The hook portions are connected together and the openings are in alignment for reception of a connecting member for connecting the tube hanger to a supporting member and for holding the members together in a tube supporting position. The sheet members have an inside contour which is substantially identical to the outside contour whereby such members can be stamped from a single sheet of material without wasting material between members being formed.

An object of the present invention is to provide an improved tube hanging clamp for a conveyor apparatus.

Another object of the invention is to provide a tube hanging clamp which is economical to produce and dependable in use.

A further object of the invention is to provide a tube hanging clamp for saving considerable labor time for installation.

Other objects, advantages, and novel features of the present invention will become apparent from the following detailed description of the invention when considered in conjunction with the accompanying drawings.

BRIEF DESCRIPTION OF THE DRAWINGS

FIG. 1 is a perspective view of the tube hanging apparatus of the present invention as shown in use;

FIG. 2 is a perspective exploded view of the present invention;

FIG. 3 is an enlarged cross-sectional view taken along line 3—3 of FIG. 1;

FIG. 4 is a side elevational view of one-half of the tube hanging structure of the present invention; and FIG. 5 is a view taken along line 5—5 of FIG. 4.

DESCRIPTION OF THE PREFERRED EMBODIMENT

Referring now to the drawings wherein like reference numerals designate identical or corresponding parts throughout the several views, FIG. 1 shows a tube hanging apparatus 10 constructed in accordance with the present invention. A tube 11 is shown in FIGS. 1 and 3 and is of a type generally used in cable conveyor structures or the like. Alternatively, the top can be closed by use of a sliding cover 12 or such tube 11 can be constructed such that it is completely cylindrical in shape if no top access is desired. A cable 13 with nylon discs members 14 rigidly attached thereto at regular intervals thereon is disposed within the circuitous tube 11 and is also circuitous in shape such that when the cable 13 is driven through the tube 11, granular or powdery materials within the tube 11 are conveyed to desired drop points around the tube 11. Since it is customary, as discussed above to hang such tubular structures 11, the clamp 10 is used.

The tube hanging apparatus 10 is comprised primarily of two parts 15 and 16 which are identical in shape. The members 15 and 16 include a hook portion 15A and 16A, a tube engaging portion 15B and 16B and a suspension portion 15C and 16C. The hook portions 15A and 16A are preferably bent as shown in FIGS. 3-5 but it is to be understood that this bending does not need to occur until the time of installation at which time the hook portions 15A and 16A can be hooked together and placed around the tube, and such bending will occur almost automatically when the top portions 15C and 16C are pushed together and held together as shown in FIGS. 1 and 3. An opening 15D and 16D are disposed in the top of the suspension portion 15C and 16C. An S-shaped hook 17 is preferably used to be received through the openings 15B and 16B so as to secure the suspension portions 15C and 16C together and to also be available to hook onto whatever support structure is provided in whatever building such conveyor system is to be installed.

The construction of the members 15 and 16 are such that the inside contour is substantially identical to the outside contour so that these members can be stamped out of a single sheet of sheet metal and thereby one is right is next to another and there is very little, if any, waste material. This is shown for example in solid and dashed lines in FIG. 4.

In operation, once the members 15 and 16 are stamped out of such member of sheet metal or the like, the hooks are merely joined together as indicated by the dashed line 18 in FIG. 2 to the position shown in FIG. 3 wherein the tube engaging portions 15B and 16B are securely around the tube 11 and abutment therewith. The openings 15D and 16D are then aligned and the S-hook 17 is then placed through the openings 15D and 16D to secure the suspension ends 15C and 16C together. The S-shaped hook 17 is then hooked onto a support structure of a building or the like (not shown). Such tube hanging structure 10 is likewise provided wherever support for such tube 11 is needed.

Accordingly, it can be readily appreciated that the tube hanging structure of the preferred embodiment does indeed accomplish all of the objects referred to above. Obviously many modifications and variations of the present invention are possible in light of the above teachings. It is therefore to be understood that, within the scope of the appended claims, the invention may be practiced otherwise than as specifically described.

I claim:

1. A tube hanger comprising:
   a pair of substantially identical sheet members, each of said sheet members including a front side, a back side, an inside edge and an outside edge, the width of the front and back sides being substantially wider than the thickness of said inside and outside edges, each of said members including a lower hook portion, a central tube engaging portion and an upper suspension portion, an opening being disposed in the suspension portion, the hook portions of said members being disposed completely below the tube being hung and being in engagement with each other, each said hook portion comprising a horizontally disposed, substantially V-shaped element having one leg extending from the tube engaging portion to an apex and a second leg extending from the apex downwardly at an angle to said first leg and bent slightly from the plane of the member to facilitate engagement with the other hook portion such that the legs of one hook portion are disposed on opposite front and back sides of the other hook portion, said openings being substantially in alignment, said members including an inside contour on the inside edge thereof and an outside contour on the outside edge thereof, the inside contour of the tube engaging portion conforming substantially to the outside contour of the desired tube to be suspended and said inside and outside contours being substantially identical whereby said sheet members can be cut out from a sheet of material without wasting material between members as they are formed; and
   means extending through the openings in said members for connecting said tube hanger to a supporting member and for holding said members together in a tube supporting position.

2. A tube hanger as defined in claim 1 wherein said sheet members are constructed of metal.

3. A tube hanger as defined in claim 1 wherein the axis of a tube being held by said sheet members extends in a forward and rearward direction with respect to the front side and back side of the sheet members.

4. A tube hanger as defined in claim 3 wherein the axis of the openings in said sheet members are substantially parallel to the axis of the tube being suspended by said sheet members.

* * * * *